(No Model.)  
2 Sheets—Sheet 1.

J. S. THOMSON.
CHURN.

No. 501,384.  Patented July 11, 1893.

WITNESSES:
Fred G. Dieterich
Edw. H. Byrn

INVENTOR
John S. Thomson,
BY
ATTORNEYS.

(No Model.) 2 Sheets—Sheet 2.

J. S. THOMSON.
CHURN.

No. 501,384. Patented July 11, 1893.

WITNESSES:
Fred G. Dieterich
Edw. W. Byrn

INVENTOR
John S. Thomson
By
Munn & Co.
ATTORNEYS.

United States Patent Office.

JOHN SEN THOMSON, OF MELBOURNE, VICTORIA.

CHURN.

SPECIFICATION forming part of Letters Patent No. 501,384, dated July 11, 1893.

Application filed May 18, 1892. Serial No. 433,495. (No model.) Patented in Victoria June 2, 1892, No. 9,691, and in England June 30, 1892, No. 546.

*To all whom it may concern:*

Be it known that I, JOHN SEN THOMSON, of Melbourne, Victoria, have invented a new and useful Improvement in Machines for Churning, &c., (for which I have obtained a patent in Victoria, No. 9,691, dated June 2, 1892, and also in Great Britain, No. 546, dated June 30, 1892,) of which the following is a specification.

This invention has been designed mainly for use as a churn of the type that aerates as well as agitates and which is also useful for "pasteurizing" milk, i. e., heating the milk within the apparatus to a temperature of about 150°, by passing heated air into it and then quickly cooling it therein by air of a lower temperature. Milk so treated becomes wholesome and will keep for a longer period than ordinary milk.

My invention consists in the peculiar construction and arrangement of parts which I will now proceed to describe with reference to the drawings in which—

Figure 1:
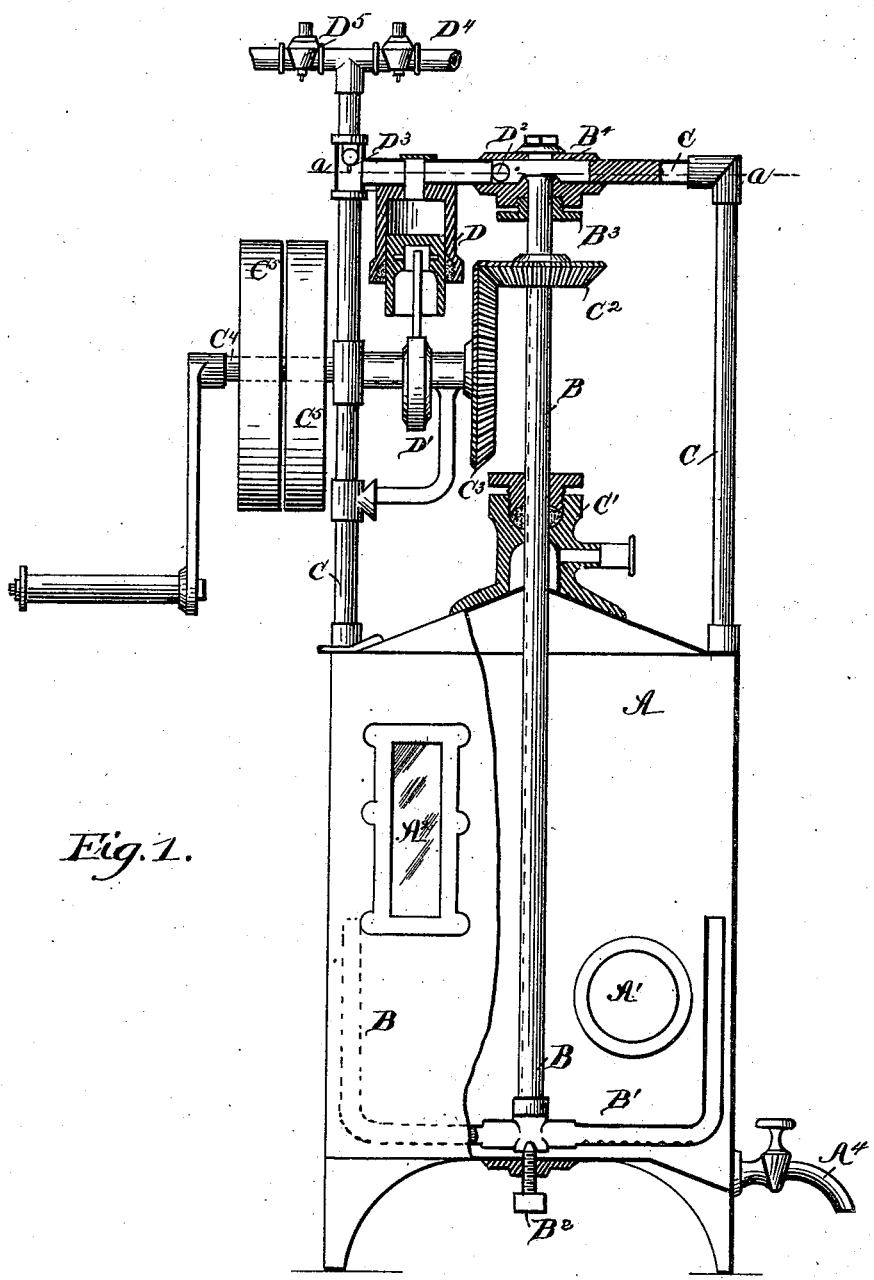
Figures 2, 4:
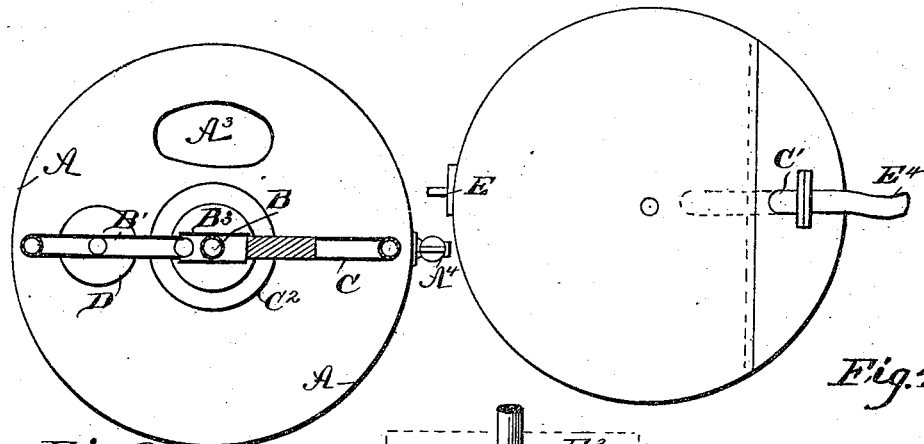
Figure 3:
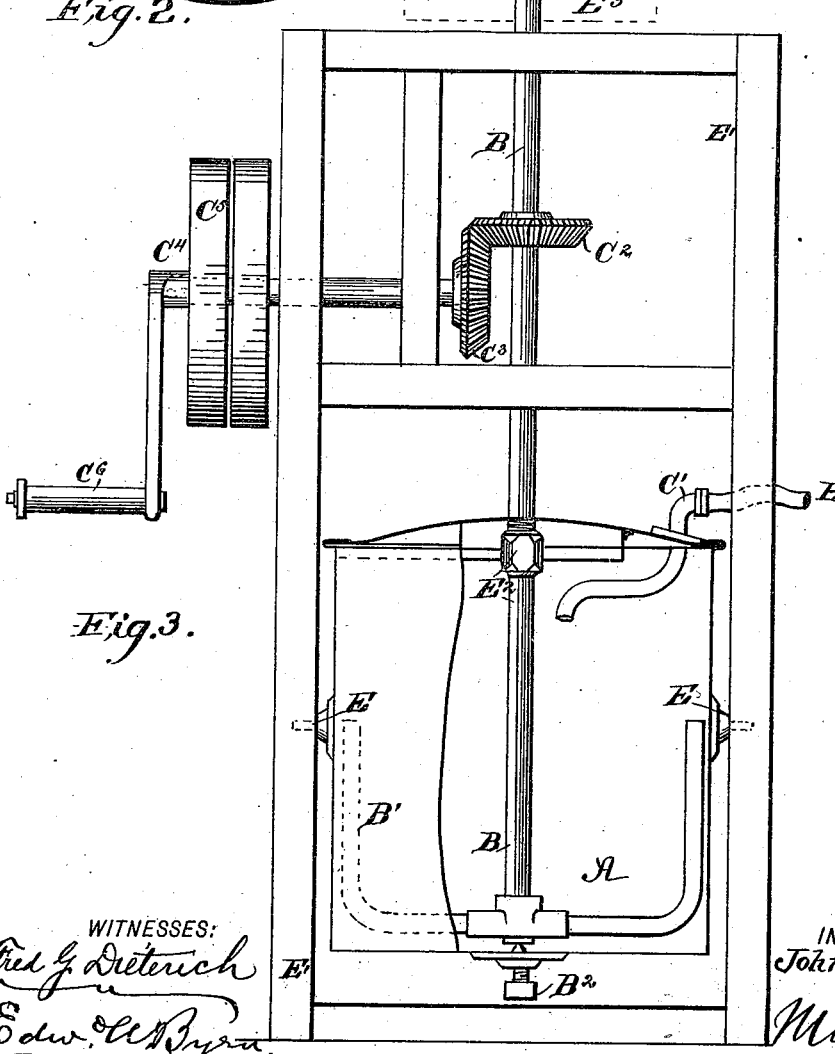

Figure 1 is a sectional elevation of a machine fitted up as a churn. Fig. 2 is a plan view partly in section looking down from line $a\ a$ Fig. 1. Fig. 3 shows a modified form of the machine and Fig. 4 shows a plan of its cover.

In Figs. 1 and 2 A is an inclosed vessel shown as constructed of metal, although it may be of wood or other suitable material.

A' is a cleaning out door, $A^2$ a glass sight window, and $A^3$ (Fig. 2) a supply hole or door in top of vessel, and $A^4$ a draw off tap.

B is the central tubular spindle having radial arms B' projecting from it at its lower end, such arms having upward extensions that just clear the inside of the vessel. These upward extensions act as beaters, dashers, stirrers, and scrapers for the cream that give it a strong peripheral motion.

$B^2$ is the pivot screw for the bottom end of the spindle, the top end of which works in a stuffing box $B^3$ formed in a branch piece upon the crown of the vessel A forming a bearing around spindle B; $C^2$ a bevel pinion upon spindle B, and $C^3$ a bevel wheel gearing with said pinion and keyed upon a shaft $C^4$ supported in bearings carried by frame C.

$C^5$ are driving pulleys, and $C^6$ a crank handle, both on shaft $C^4$.

D is a pump worked by eccentric D' upon shaft $C^4$, and $D^2$ and $D^3$ are spherical check and retention valves operating in connection with the pump.

$D^4$ and $D^5$ are cocks for admitting either air or liquids to the pump.

In Figs. 3 and 4 the vessel A is shown supported on side trunnions C that are supported in suitable bearings in frame E', also the tubular spindle B is furnished with a coupling $E^2$ to allow of its being disconnected when the vessel A is to be canted. The cover of vessel A is made in two parts, the part carrying branch C' being a fixture, and the remainder capable of being lifted off.

The dotted lines $E^3$ indicate a belt pulley which may be arranged on shaft B when so desired in place of the spur gear.

$E^4$ is a flexible pipe.

It will be obvious that when churning with my apparatus if air and water can be obtained at the desired pressure no pump will be required upon the machine. Also I wish it to be understood that when supplying air through the perforated arms under the cream in churning, the branch piece C' is used as an outlet for the air that rises through the cream, while when an ejector or exhauster is applied to branch piece C', the end of tubular spindle may be open to atmosphere.

In churning with an apparatus as illustrated in Figs. 1 and 2 of my drawings with branch piece C' open to the atmosphere the necessary quantity of cream is placed in the vessel, and upon motion being imparted to the gears tubular spindle B rotates, and the pump draws in air through the open cock $D^4$, cock $D^5$ meanwhile being closed. Then as the perforated arms B' rotate the air finds ingress to aerate the cream while it is also being agitated or dashed about by said arms until such time as the butter "comes" or forms into globules, the air escaping at the branch C'. When the butter comes the air cock $D^4$ is closed, and the water cock $D^5$ is opened to supply water to wash off the buttermilk, which latter is allowed to flow through tap $A^4$, and afterward the butter is removed from within the vessel.

In making use of my invention I may employ it for other purposes besides churning butter and "pasteurizing" milk. Thus for instance by introducing steam through the central tube and using water in the receptacle, it may be used for washing clothes. It may also be used as a mixing machine for liquids and solids of various kinds.

I am aware that it is not broadly new in churns to aerate as well as agitate the cream, and I do not claim this broadly.

Having thus described my invention, what I claim as new, and desire to secure by Letters Patent, is—

1. The combination with the vertical cylindrical vessel; of a central tubular spindle extending to the bottom of said vessel and having at its lower end tubular and perforated radial arms the outermost parts of which are bent up and stand parallel with side of vessel to act as beaters and scrapers substantially as herein described and shown.

2. The combination with the vertical cylindrical vessel; of a central tubular spindle having at its lower end tubular and perforated radial arms with their outer ends bent up parallel to the sides of the vessel, and a coupling or bearing C' for the tubular shaft at the upper end of the receptacle provided with an outlet for air substantially as shown and described.

3. The combination with the receptacle A; of the revolving tubular shaft B with upturned and perforated arms B' at its lower end, and bearing C' with air outlet at the top of the receptacle, the shaft $C^4$ with bevel gears $C^3$ $C^2$ for rotating the central tube and an eccentric D', the hollow frame work C C with pump D located above the eccentric, valves $D^2$ $D^3$ and inlet cocks $D^4$ $D^5$ substantially as shown and described.

Dated this 23d day of January, 1892.

JOHN SEN THOMSON.

Witnesses:
JOSEPH H. BUSH,
C. HARKETT.